(12) United States Patent
Kao et al.

(10) Patent No.: US 7,559,682 B2
(45) Date of Patent: Jul. 14, 2009

(54) BACKLIGHT MODULE WITH DETACHABLE LIGHT SOURCE SET

(75) Inventors: Hung-Chen Kao, Taoyuan Hsien (TW); Ke-Chin Chang, Hsinchu (TW); Fu-Tung Chen, Pate (TW); Yuh-Hsien Wang, Pingchen (TW); Cheng-Chia Wu, Panchiao (TW); Sheng-Hao Huang, Chungli (TW)

(73) Assignee: Hannstar Display Corporation, Taipei (TW)

( * ) Notice: Subject to any disclaimer, the term of this patent is extended or adjusted under 35 U.S.C. 154(b) by 423 days.

(21) Appl. No.: 11/072,731

(22) Filed: Mar. 4, 2005

(65) Prior Publication Data

US 2006/0066767 A1   Mar. 30, 2006

(30) Foreign Application Priority Data

Sep. 30, 2004   (TW) .............................. 93129717 A

(51) Int. Cl.
  *F21V 19/04*   (2006.01)
(52) U.S. Cl. ....................................... 362/561; 362/581
(58) Field of Classification Search .................. 349/61, 349/62, 64, 70; 362/561, 581, 330, 652, 362/377, 255, 221, 634, 511
See application file for complete search history.

(56) References Cited

U.S. PATENT DOCUMENTS

| | | | |
|---|---|---|---|
| 6,574,047 B2 * | 6/2003 | Hawver ....................... | 359/626 |
| 6,580,477 B1 * | 6/2003 | Cho ............................ | 349/65 |
| 6,867,827 B2 * | 3/2005 | Cha et al. ................... | 349/65 |
| 6,916,102 B2 * | 7/2005 | Lin ............................. | 362/634 |
| 7,086,775 B2 * | 8/2006 | Huang et al. ............... | 362/652 |
| 7,140,750 B2 * | 11/2006 | Kim ........................... | 362/218 |
| 7,154,572 B2 * | 12/2006 | Lee et al. ................... | 349/61 |
| 7,159,996 B2 * | 1/2007 | Huang et al. ............... | 362/225 |

* cited by examiner

*Primary Examiner*—Sharon E Payne
(74) *Attorney, Agent, or Firm*—Thomas, Kayden, Horstemeyer & Risley

(57) ABSTRACT

The present invention provides a backlight module used for a liquid crystal display. The backlight comprises a back plate having a first track set, a detachable light source set disposed on the back plate, and an optical films set combined with the back plate. The detachable light source set comprises a base, a light source disposed on a first side of the base, and a second track set disposed on a second side of the base. The second track set can connect to and slide on the first track set. Then the detachable light source set is removable, and the light source is easily to be replaced.

6 Claims, 8 Drawing Sheets

BACKLIGHT MODULE WITH DETACHABLE LIGHT SOURCE SET

RELATED APPLICATIONS

The present application is based on, and claims priority from, Taiwan Application Serial Number 93129717, filed Sep. 30, 2004, the disclosure of which is hereby incorporated by reference herein in its entirety.

BACKGROUND

1. Field of Invention

The present invention relates to a backlight module for a liquid crystal display (LCD) apparatus. More particularly, the present invention relates to a backlight module with detachable light source set.

2. Description of Related Art

The liquid crystal display (LCD) is an apparatus for displaying images by exploiting the characteristics of liquid crystal. The LCD is generally used in every kind of personal device nowadays, such as a mobile phone, a PDA, a digital camera, a television and a billboard, due to having more flexibility of application than traditional cathode ray tube (CRT) display with respect to size and weight.

An obvious difference between the principles of LCD and CRT displays is that the cathode ray tube of a CRT display can radiate light by itself, but the liquid crystal of the LCD cannot; that is to say, the CRT display can display images on the screen without an additional light source, but the LCD cannot. The LCD needs a backlight module in order to display images on the screen.

FIG. 1 shows an exploded structure of a conventional LCD. It can be seen that the LCD roughly comprises a bezel 102, a liquid crystal panel 104, a frame 106, an optical films set (including a diffuser plate) 108 and a backlight module 110. After the light radiated from the backlight module 110 passes through the optical films set 108, a uniform light source irradiating the liquid crystal panel 104 can be obtained. Thus the backlight module is a critical component in an LCD device.

Referring to FIG. 1, the backlight module comprises a back plate 112, a plurality of lamps 114, a lamp holder 116 and a driver circuit (not shown in the figure). The lamps 114 may be cold cathode fluorescent lamps (CCFL), which are arranged in parallel on the back plate 112; and the lamp holder 116 is used for fastening the lamps 114. The LCD is fabricated by stacking and fastening the frame 102, the liquid crystal panel 104, the bezel 106, the optical films set 108 and the backlight module 110 in order.

According to the foregoing components and manner of assembly, when the liquid crystal panel 104 displays images, the brightness will be insufficient or non-uniform if any one of the lamps 114 is damaged or broken, exhibiting poor-quality display. At that time, the damaged or broken lamp should be replaced. First, the backlight module 110 is disassembled from the LCD. Next, the lamp holder 116 is removed. Then, the damaged or broken lamp can be replaced. It can be seen that the replacement procedure is not only complex but also having a possibility of damaging other components near the replaced lamp, because the components, such as the other workable lamps, optical films set 108 and the driver circuit, are all very fragile.

Furthermore, replacing lamps in an LCD will become increasingly harder because of the tendency towards larger LCD. A backlight module where the backlight lamps can be readily replaced is certainly needed for the present LCD system.

SUMMARY

It is therefore an objective of the present invention to provide a backlight module where the lamps can be replaced individually.

It is another objective of the present invention to provide a liquid crystal display where the lamps in the backlight module can be replaced individually.

It is still another objective of the present invention to provide a liquid crystal display where the lamps in the backlight module can be replaced without disassembling the backlight module.

It is another objective of the present invention to provide a liquid crystal display where the time for maintenance of the backlight module can be reduced.

It is still another objective of the present invention to provide a liquid crystal display where the probability of damaging the components in the system can be reduced.

In accordance with the foregoing and other objectives of the present invention, every lamp of the backlight module is kept separated and installed on an independent base, wherein, one base may hold more than one lamp. The light source holders are used to wrap both terminals of the lamp and then be individually fastened by clipping members disposed in both terminals of the base for fastening the lamp onto the base. The back of the base has a second track set parallel to the lamp. In addition, the inner surface (which faces the interior of the liquid crystal display) of the back plate of the backlight module, has several first track sets, which are parallel to each other and can be connected to and slid on by the second track set, for many bases can be loaded into the liquid crystal display along the first track sets and held on the back plate. Thus, one side of the liquid crystal display has an opening to be the channel for the bases to be moved into and out of the liquid crystal display. After the bases are loaded into the liquid crystal display and held on the back plate, the lamps on the bases are electrically coupled to the power supplied from the liquid crystal display for lighting the lamps.

It is to be understood that both the foregoing general description and the following detailed description are by examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
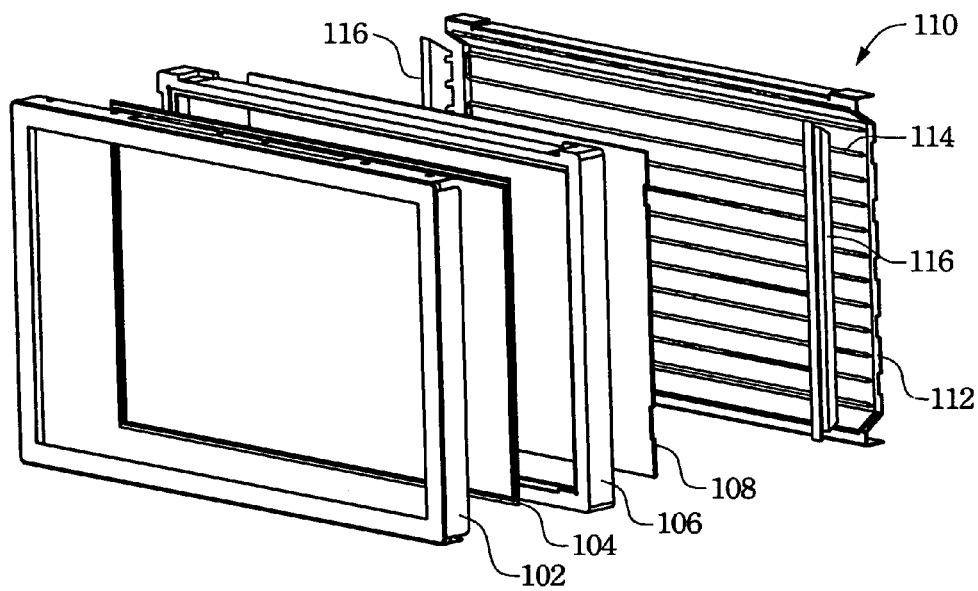
FIG. 1 illustrates a framework of the conventional LCD.

Reference will now be made in detail to the present preferred embodiments of the invention, examples of which are illustrated in the accompanying drawings. Wherever possible, the same reference numbers are used in the drawings and the description to refer to the same or like parts.

The principle of the present invention is to change the original structure from one in which all the lamps are integrated into the back plate of a liquid crystal display to one with a compound, modular structure. Every lamp in the backlight component can be individually installed on the back plate using a combinatorial structure; that is to say, each lamp can be independently mounted on and dismounted from the back plate. A side of the liquid crystal display has an opening to be an entrance for the lamps; thus, the lamps can be mounted or dismounted without disassembling the whole liquid crystal display. Hence, the risk of other components being damaged during disassembly is reduced.

Figure 2A:
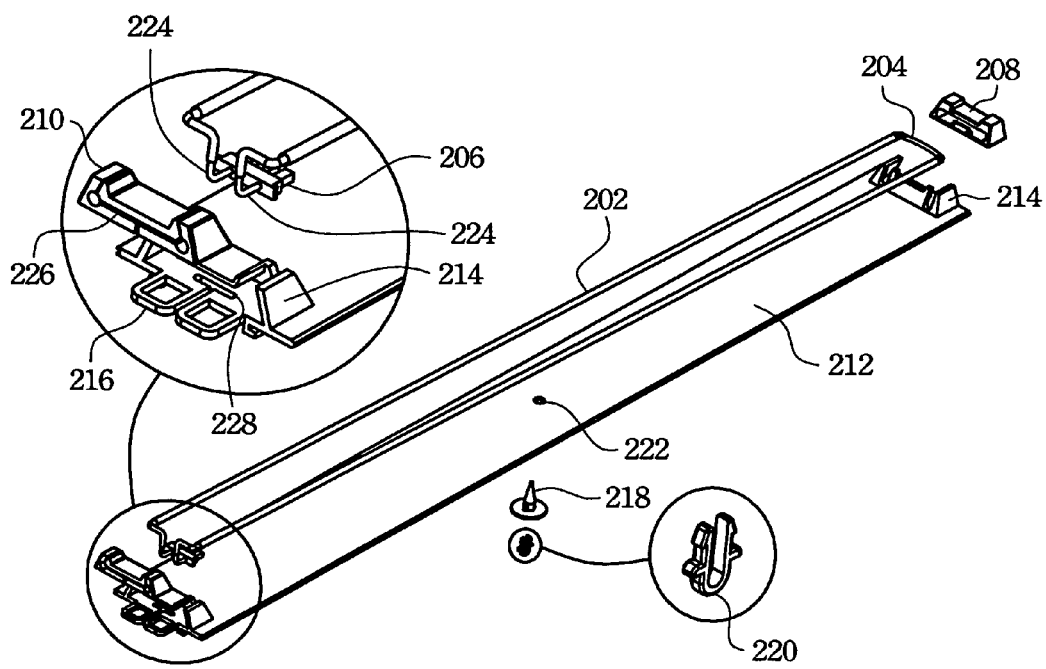
FIG. 2A illustrates a framework of the light source set according to one preferred embodiment of this invention.

FIG. 2A shows an exploded drawing of the detachable light source set according to an embodiment of the present invention, wherein the major components are depicted, such as a light source 202, a first light source holder 208, a second light source holder 210 and a base 212. The light source 202 is disposed on a first side or an upper side of the base 212. In this embodiment, the light source 202 is a lamp pair formed by putting two long lamps, such as conventional cold cathode fluorescent lamps (CCFL), with equal length in parallel with each other. One terminal of the light source 202 is a short terminal 204 and the other one is a power terminal 206, wherein the short terminal 204 is formed by connecting one terminal of one of the two lamps to one terminal of the other lamp; and the power terminal 206 is formed by connecting two power conductors 224 used to receive the power to the other terminal of the two lamps individually.

The structure of the foregoing light source 202 is not limited to two lamps with equal length; it can be replaced with a plurality of lamps or a U-shaped lamp, an LI-shaped lamp, a plurality of or a light emitting diode (LED). If the single U-shaped lamp is used, the short terminal 204 is inherent, without additional conductors.

In the embodiment, the light source 202 is formed from two long lamps. Due to the light source 202 being very fragile, it is recommended that the short terminal 204 and the power terminal 206 are wrapped in a first light source holder 208 and a second light source holder 210 separately before fastening the light source 202 onto the base 212. The material of the first light source holder 208 and the second light source holder 210 are not limited beyond being able to absorb and isolate shock; for example, silica gel can be used. In the aspect of structure, the first light source holder 208 should wrap the whole short terminal 204 tightly, and the second light source holder 210 should not only wrap the whole short terminal 204 tightly but also have a first trench 226 for exposing the power conductor 224.

The base 212 can contain the whole light source 202. It is recommended that a plastic material be used which has high reflectivity and is able to resist ultraviolet rays from the base 212. Both terminals of the base 212 have a clipping member 214 for tightly clipping the first light source holder 208 and the second light source holder 210, such that the light source 202 can be fastened onto the base 212. The clipping member 214 and the base 212 may be formed as one piece, or the clipping member 214 can be fastened on the base 212 by a conventional fastening method.

For convenience of use, it is recommended that a handle 216 be disposed at one terminal of the base 212 such that users can grab the base 212. The form of the handle 216 is not limited by the illustration in FIG. 2A; it may be a handle with a single aperture or without any aperture as long as users are able to grasp it easily.

The components of the light source set may scrape the diffuser plate or the optical films set after the light source set enters the liquid crystal display; thus, a back inserted spacer 218 may be used to prevent the damage. The spacer 218 is inserted into a first hole 222 of the base 212 from a second side or a bottom side of the base 212, and then the optical films set is placed in contact with the spacer 218. The spacer 218 is fastened on the base 212 preferably by a resilience bolt 220 used to hold the first hole 222, maintaining the space between the base 212 and the optical films set. U.S. patent application Ser. No. 10/957,670 can be referred to for more detail about the spacer 218.

Figure 2B:
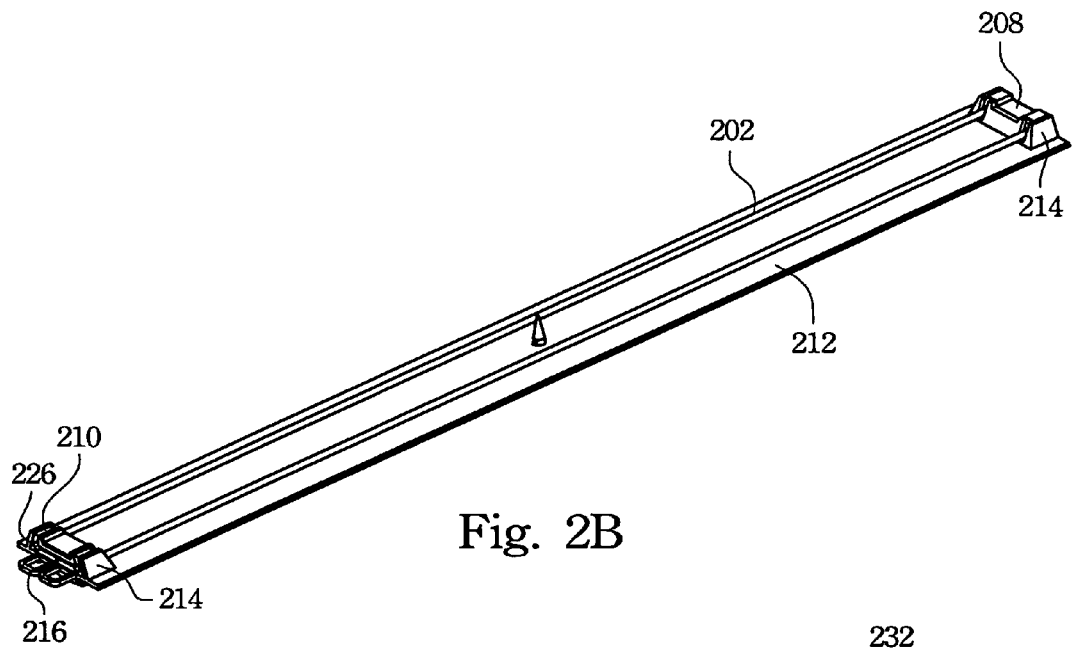
FIG. 2B illustrates the assembly of the light source set according to one preferred embodiment of this invention.

FIG. 2B is an oblique drawing of the light source set structure, which is obtained by assembling all the components shown in FIG. 2A.

Figure 2C:
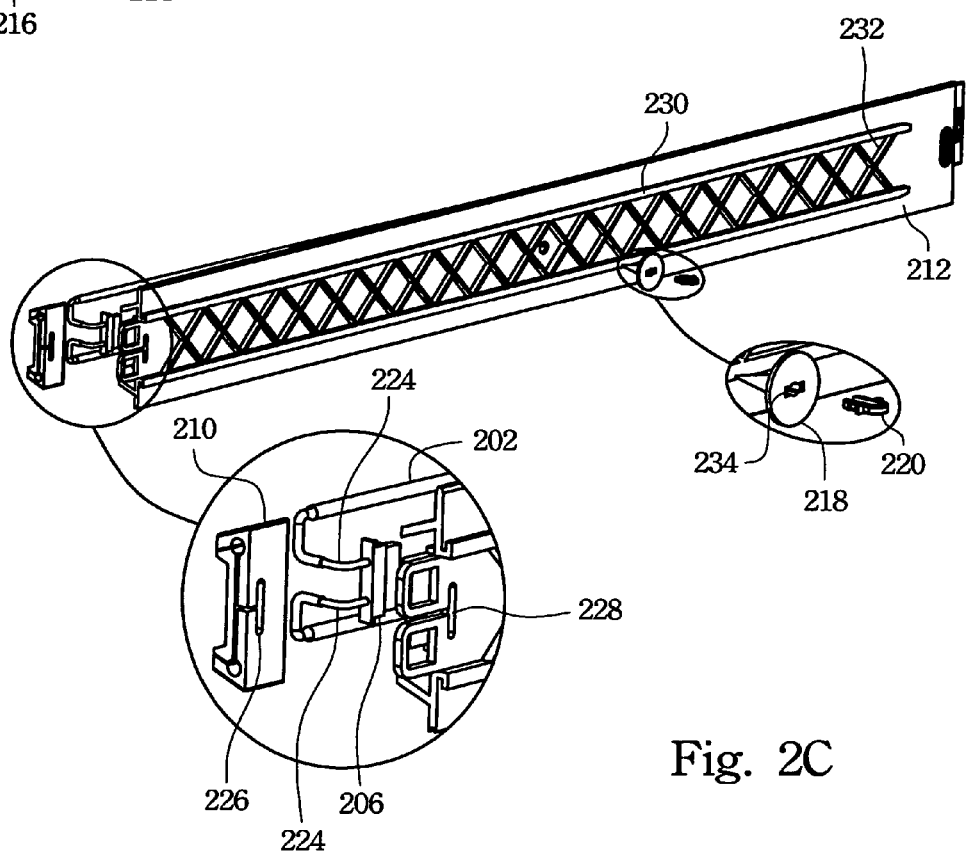
FIG. 2C illustrates the backside of the light source set according to one preferred embodiment of this invention.

FIG. 2C is a back view of the light source set structure shown in FIG. 2A. The first trench 226 of the second light source holder 210 provides a path for extending the power conductor 224 from the power terminal 206 of the light source 202. Also, the second side of the base 212 has a second trench 228 corresponding to the first trench 226 so that the power conductor 224 can further extend to the second side of the base 212.

The second side of the base 212 also has a second track set 230, which comprises a track for slipping the base 212 into the liquid crystal display. In this embodiment, the second track set 230 consists of two parallel tracks that have lengths similar to a long edge of the base 212. The form of each of the two tracks is L-shaped toward the same or different orientations. The geometric characteristics of the tracks are not limited herein; the base 212 can be connected to and slipped on another track as is described later.

A reinforced structure 232 may be applied between the two tracks of the second track set 230 and on the second side of the base 212 to help resist deformation, or else the base 212 may be hard to use. The deformations may be caused by long-term use or temperature variations. In the embodiment, the reinforced structure 232 is formed by a continuous X-shaped structure; a W-shaped structure or an I-shaped structure may also be used.

The installation of the spacer 218 can be seen in FIG. 2C. The bolt 220 is a stiff U-shaped bolt. When the spacer 218 is inserted into the first hole 222 of the base 212, the bolt 220 can be inserted into a second hole 234 of the spacer 218 and the first hole 222 in turn. Due to the bolt 220 being resilient, the spacer 218 can be sustained on the base 212 by the bolt 220, propping the edge of the first hole 222.

Figure 3A:
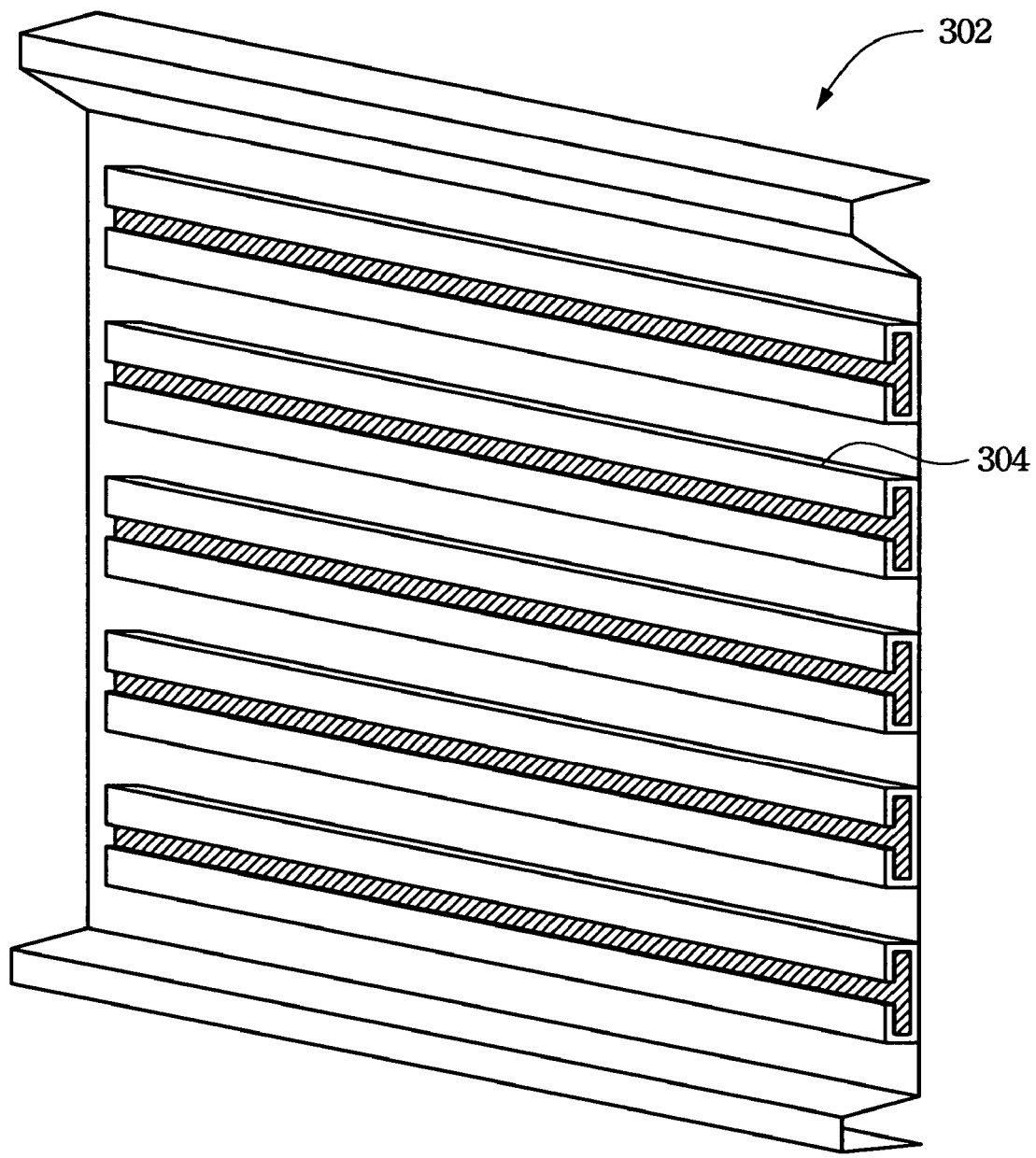
FIG. 3A illustrates a structure of the back plate according to one preferred embodiment of this invention.

FIG. 3A shows a back plate 302 of the backlight module according to the present invention. Compared with the back plate 112 shown in FIG. 1, the lamps 114 and lamp holder 116 on the back plate 302 are not necessary anymore because the lamps or light sources are made on the detachable light source set as shown in FIG. 2A. Therefore, a first track set 304 disposed on the first surface or an upper surface of the back plate 302 is needed for the detachable light source set can be drawn from or installed into the back plate 302. The first track set 304 and the back plate 302 can be formed as different components or as one piece. In this embodiment, each of the first track sets 304 may be formed by two parallel tracks, which are parallel with the sliding direction of the detachable light source set. The first track set 304 has a structure corresponding to the second track set 230 shown in FIG. 2C; that is to say, the second track set 230 and the first track set 304 can connect with each other for the detachable light source set to be able to slide on the back plate 302. In this embodiment, the tracks of the first track set 304 all have L-shaped structures that are back to back with each other such that the first track set 304 can slide on the second track set 230. In practice, the geometric characteristic of the first track set 304 is not limited, and as long as the first track set 304 can stay and slide on the second track set 230.

Figure 3B:
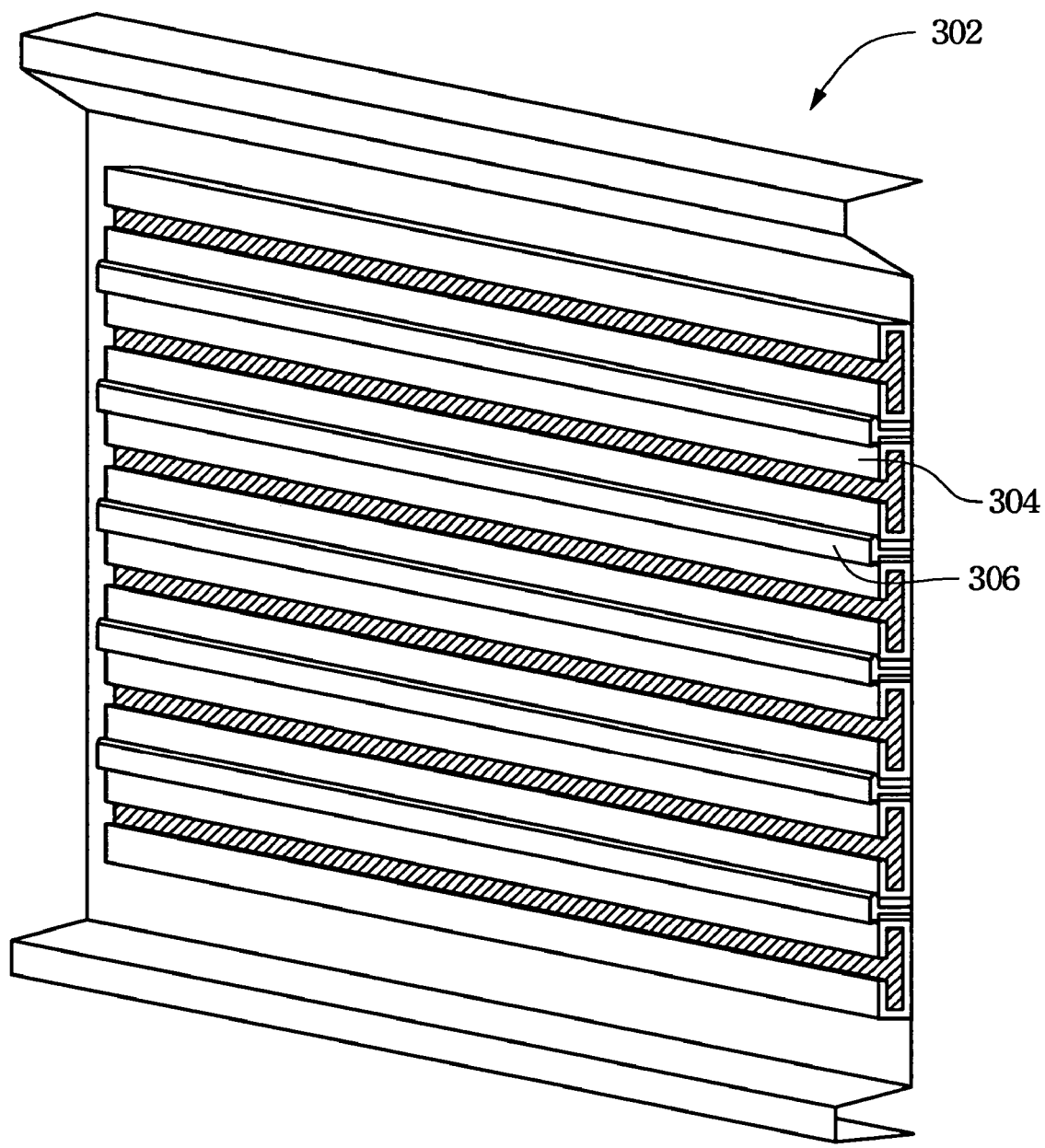
FIG. 3B illustrates a structure of the back plate according to one preferred embodiment of this invention.

FIG. 3B shows another embodiment of a back plate 302 of the backlight module according to the present invention. The first track set 304 and the back plate 302 can be formed as different components or as one piece. In this embodiment, in addition to each first track set 304 disposed on the first surface of the back plate 302 being formed by two parallel tracks which are parallel to the sliding direction of the detachable light source set and able to connect with the second track set 230, an auxiliary holder 306 is disposed in the space between every first track set 304 for assisting the movement of the light source set. In a preferred embodiment, the auxiliary holder 306 and the back plate 302 are formed as one piece to enhance the strength of structure. In practice, in addition to the length of the auxiliary holder 306 and the first track set 304 being similar, the length of the auxiliary holder 306 may be less than the first track set 304, and the auxiliary holder 306 may be disposed near a terminal or at the middle space between the adjacent first track sets 304.

Figure 4A:
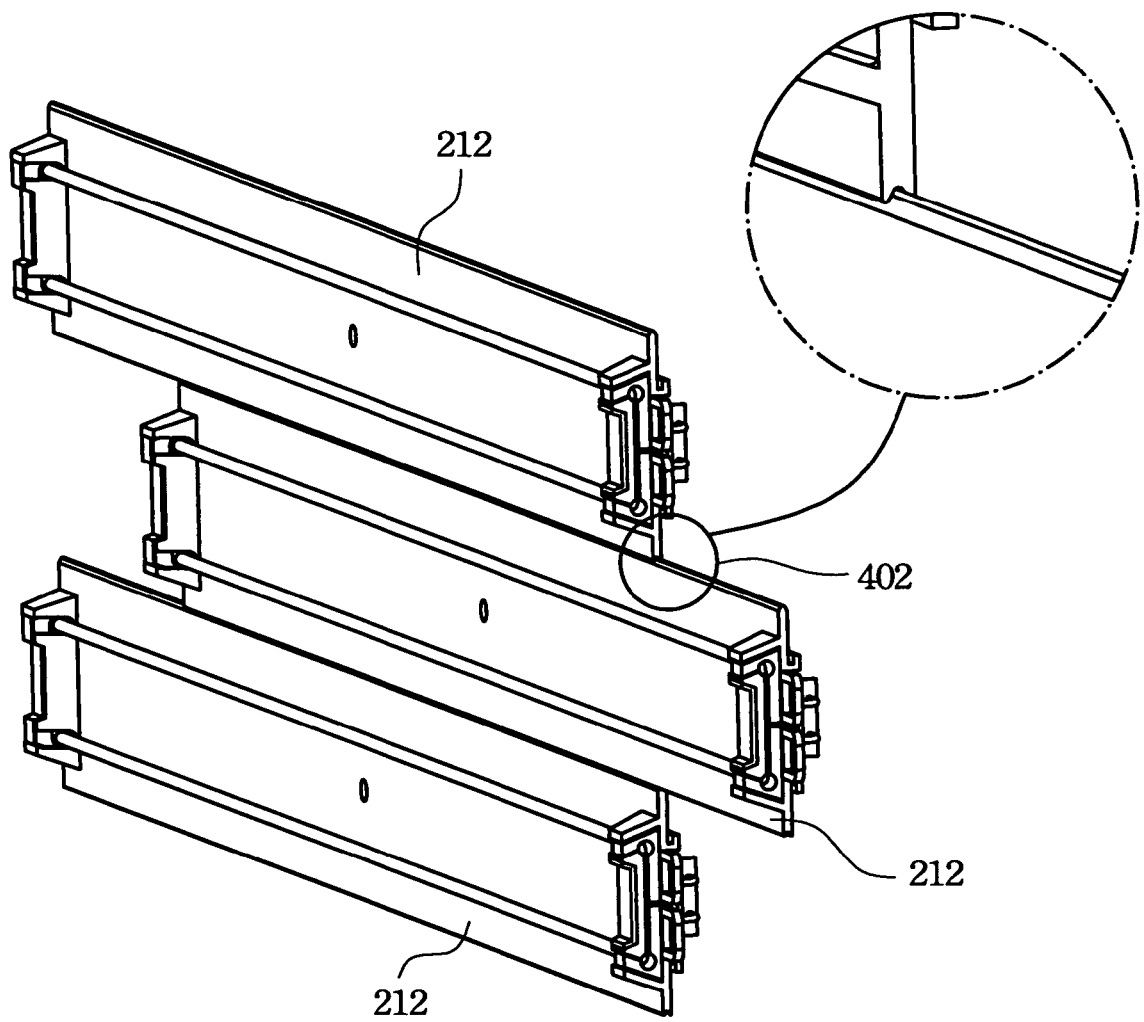
FIG. 4A illustrates the installation of the light source set according to one preferred embodiment of this invention.

FIG. 4A shows an arrangement of a plurality of detachable light source set. In the embodiment, a plurality of bases 212 are adjacent to each other lengthwise, as shown in a position 402, for enhancing the stability of the installed detachable light source set. One of the bases 212 may be deformed after long-term use of the detachable light source set; then, the base 212 cannot remain adjacent to another base's long edge, and problems such as light slant and non-uniform brightness are indirectly brought about.

Figure 4B:
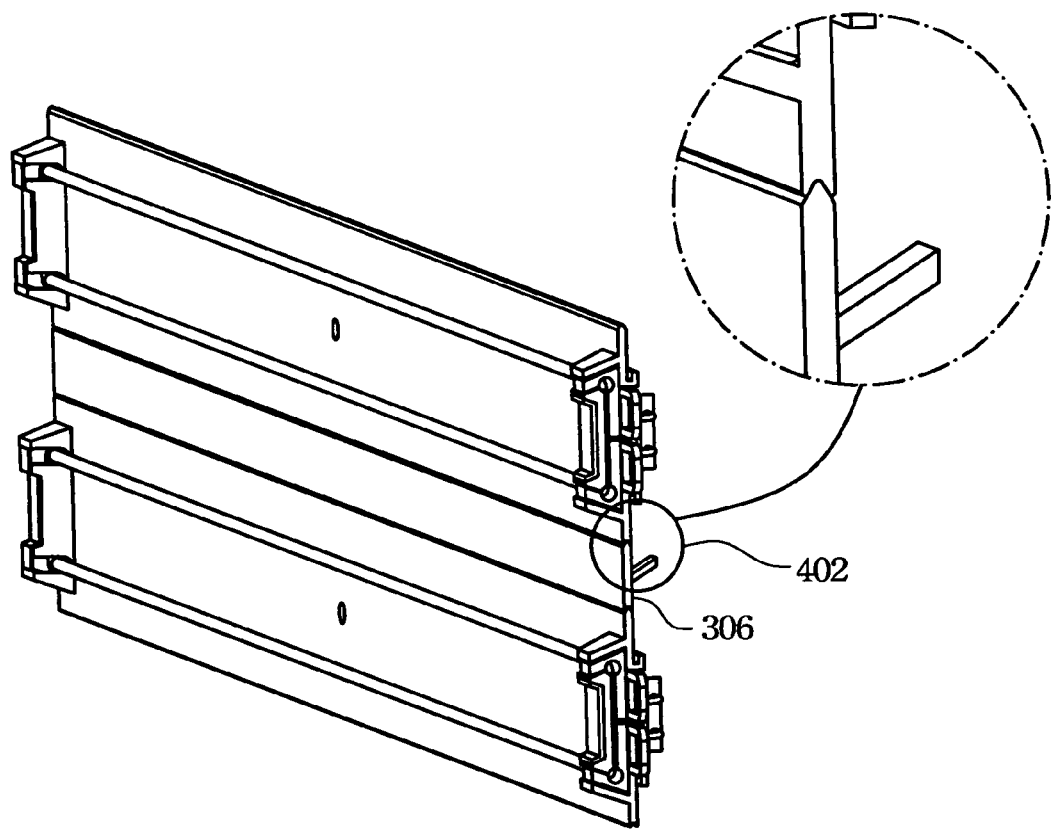
FIG. 4B illustrates the installation of the light source set according to one preferred embodiment of this invention.

Therefore, the joint strength between each base 212 can be enhanced after an auxiliary structure, such as the auxiliary holder 306 shown in FIG. 3B, is applied. FIG. 4B shows another arrangement of a plurality of detachable light source set. In this embodiment, the base 212 adjoins the auxiliary holder 306, as shown in a position 402, and then the stability of the installed detachable light source set can be enhanced.

Figure 4C:
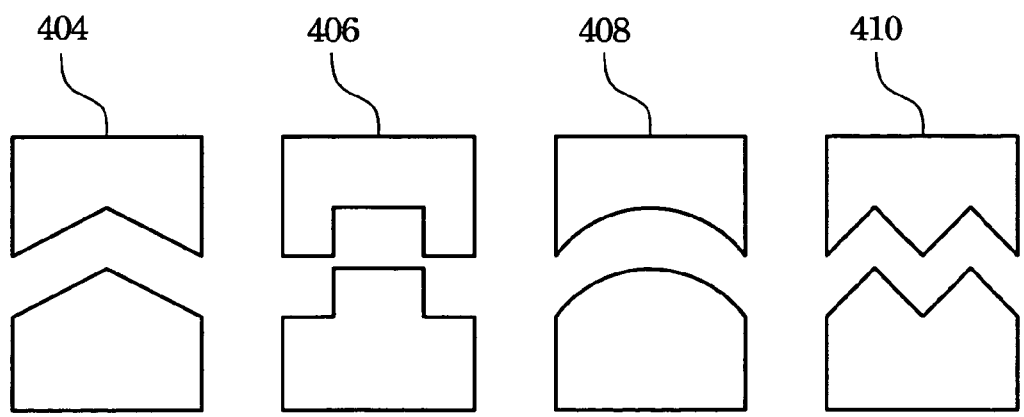
FIG. 4C illustrates example cross-sections of edges of the light source set according to one preferred embodiment of this invention.

FIG. 4C shows cross-sections of adjacent areas between the long edges of two bases 212 or between a base 212 and an auxiliary holder 306. In this embodiment, a V-shaped cross-section 404, a concave-and-convex type cross-section 406, a U-shaped cross-section 408 and a W-shaped cross-section 410 are exemplified for assisting the joining of the base 212.

Figure 5:
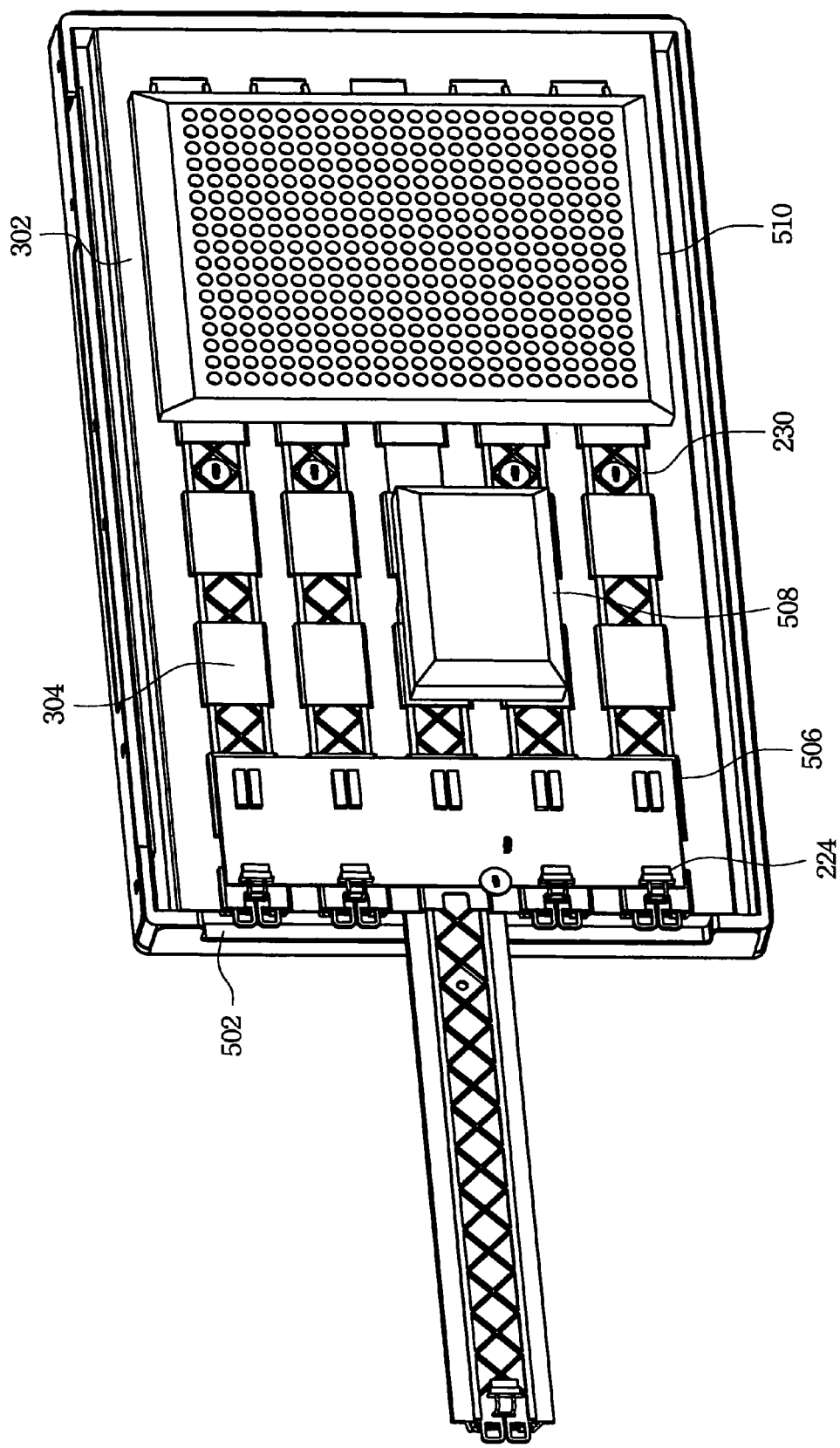
FIG. 5 illustrates the backside of the liquid crystal display according to one preferred embodiment of this invention.

FIG. 5 shows a back view of a liquid crystal display according to another embodiment of the present invention, wherein the first track sets 304 and the back plate 302 are formed as one piece and the second track sets 230 can be seen. Compared with a traditional liquid crystal display shown in FIG. 1, a bezel 102 and a frame 106 of the liquid crystal display according to the present invention should have an opening 502 for receiving and ejecting the detachable light source set, wherein a preferred position for the opening 502 is on a side which is not traversed by any circuitry. After the detachable light source set is inserted into the liquid crystal display and the power conductor 224 is coupled to a power supply device, then the detachable light source set can work normally. Moreover, according to FIG. 5, the devices which are installed on the back of a back plate in a traditional liquid crystal display can be installed on the back of a backlight module according to the present invention also, such as an inverter package 506, an input/output package 508 and a system package 510 are disposed on a second surface or a bottom surface of the back plate 302, and the replacement of the detachable light source set and the operation of the liquid crystal display will not be influenced.

Figure 6:
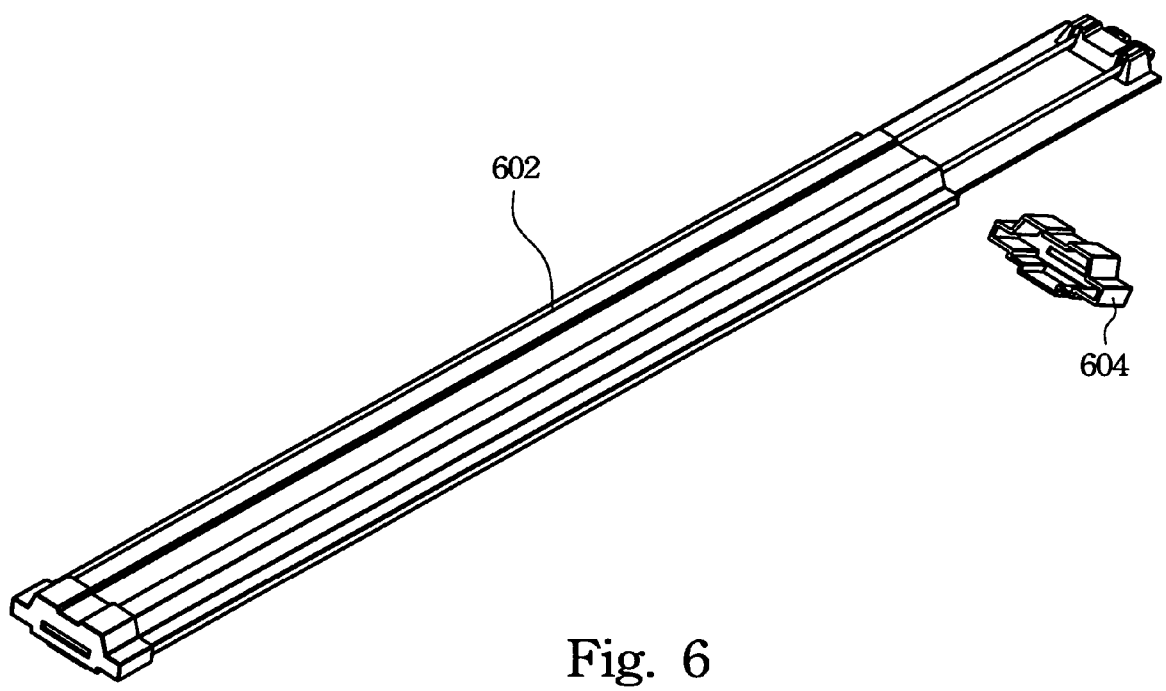
FIG. 6 illustrates a protection cartridge for the light source set according to one preferred embodiment of this invention.

FIG. 6 shows a protection cartridge of the detachable light source set for protecting a new detachable light source set or a moveable lamp that is taken out from a liquid crystal display. That means the detachable light source set is wrapped in a protection cartridge. The protection cartridge comprises a body 602 and a cover 604. The body 602 is formed of a material that is light shade, shockproof and moisture-proof. The shape of the protection cartridge generally corresponds with a contour of the cross-section of the detachable light source set, and the length of the protection cartridge is similar to the detachable light source set such that the body 602 is able to encapsulate is the whole detachable light source set when the detachable light source set is inserted into the body 602. In this embodiment, the protection cartridge having two covers 604. The two covers 604 are both used to cover the entrance of the two ends of the body 602; therefore, the two covers 604 also both have a shape that corresponds with a contour of the cross-section of the detachable light source set. The body 602 and the cover 604 may be connected to each other or be formed as one piece, and the cover 604 may also be hinged to open like a door.

One of the embodiments of the present invention has been mentioned in the foregoing description, but the invention still has various designs in practice. For example, there may be more than one light source installed on the detachable light source set shown in FIG. 2A such that the quantity of detachable light source set, which are needed by the liquid crystal display, can be reduced. Furthermore, as a condition shown in FIG. 4A that every detachable light source set is installed in the liquid crystal display, the long edges of each detachable light source set are adjoined to each other. In addition, it can be seen from FIG. 5 that the detachable light source set use an extended power conductor to connect a power supply device for acquiring the power needed by the lamps. Other designs for acquiring power are available; for example, power contacts can be substituted for power conductors so the power contacts of the detachable light source set and the power supply device can electrically connect to each other simultaneously when the detachable light source set is installed into the liquid crystal display, and then power supplying can be obtained without connecting the power conductor and the power supply apparatus manually.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module for a liquid crystal display, comprising:
- a back plate comprising a first track set, a second track set and an auxiliary holder, wherein the auxiliary holder is formed in the shape of T type and is disposed between the first track set and the second track set;
- a first detachable light source set disposed on the back plate comprising a first base, a first light source disposed on a first side of the first base, and a third track set disposed on a second side of the first base, and the first side is opposite to the second side;
- a second detachable light source set disposed on the back plate, comprising a second base, a second light source disposed on the first side of the second base, and a fourth track set disposed on the second side of the second base, and the first side is opposite to the second side, wherein the first base is engaged with one side of the auxiliary holder and the second base is engaged with the other side of the auxiliary holder; and
- an optical films set combined with the back plate, wherein the third and the fourth track set can respectively connect to and slide on the first track set and the second track set and the first detachable light source set can detach from the second detachable light source set.

2. The backlight module of claim 1, wherein the detachable light source set further comprises a spacer penetrating from the second side to the first side.

3. The backlight module of claim 1, wherein the detachable light source set further comprises a light source holder for fastening the light source on the base.

4. The backlight module of claim 1, wherein the base further comprises a handle extending from a terminal of the base.

5. The backlight module of claim 1, wherein the base further comprises a reinforced structure on the second side of the base.

6. The backlight module of claim 1, wherein a shape of a cross-section between one the first base and the second base and the auxiliary holder is a V-shaped cross-section, a concave-and-convex type cross-section, a U-shaped cross-section or a W-shaped cross-section.

* * * * *